United States Patent [19]

Maffet

[11] 4,098,006
[45] Jul. 4, 1978

[54] ORGANIC WASTE DEWATERING AND DRYING PROCESS

[75] Inventor: Vere Maffet, West Chester, Pa.

[73] Assignee: UOP Inc., Des Plaines, Ill.

[21] Appl. No.: 813,577

[22] Filed: Jul. 7, 1977

Related U.S. Application Data

[63] Continuation-in-part of Ser. No. 775,673, Mar. 8, 1977.

[51] Int. Cl.² ............................................. F26B 7/00
[52] U.S. Cl. ........................................... 34/12; 34/60; 34/61; 34/62; 71/12; 71/13; 71/14; 110/221; 110/224
[58] Field of Search ................. 34/12, 60, 61, 62; 71/12, 13, 14; 110/8 P

[56] References Cited

U.S. PATENT DOCUMENTS

| | | |
|---|---|---|
| 2,977,214 | 3/1961 | McLellan ............................. 71/12 X |
| 3,667,131 | 6/1972 | Stephanoff ........................... 71/10 X |
| 3,695,173 | 10/1972 | Cox ...................................... 100/74 |
| 3,938,434 | 2/1976 | Cox ...................................... 100/117 |
| 4,003,136 | 1/1977 | Vincent et al. ......................... 34/12 |
| 4,038,181 | 7/1977 | Talbert ................................. 210/10 |
| 4,041,854 | 8/1977 | Cox ...................................... 100/112 |

*Primary Examiner*—Leland A. Sebastian
*Attorney, Agent, or Firm*—James R. Hoatson, Jr.; John F. Spears, Jr.; William H. Page, II

[57] ABSTRACT

A process for drying organic waste, such as sewage sludge, by contacting the organic waste with hot vapors. Partial dewatering of the organic waste is achieved by admixture with a recycled portion of dried solids followed by extrusion of the mixture. The resultant extrudate is then dried, and the unrecycled portion is extruded in a separate operation to form compacted granules having good flow characteristics and suitable for application by commercial fertilizer spreaders. A plasticizer and an extrusion aid may be added to the dried material prior to extrusion.

6 Claims, 1 Drawing Figure

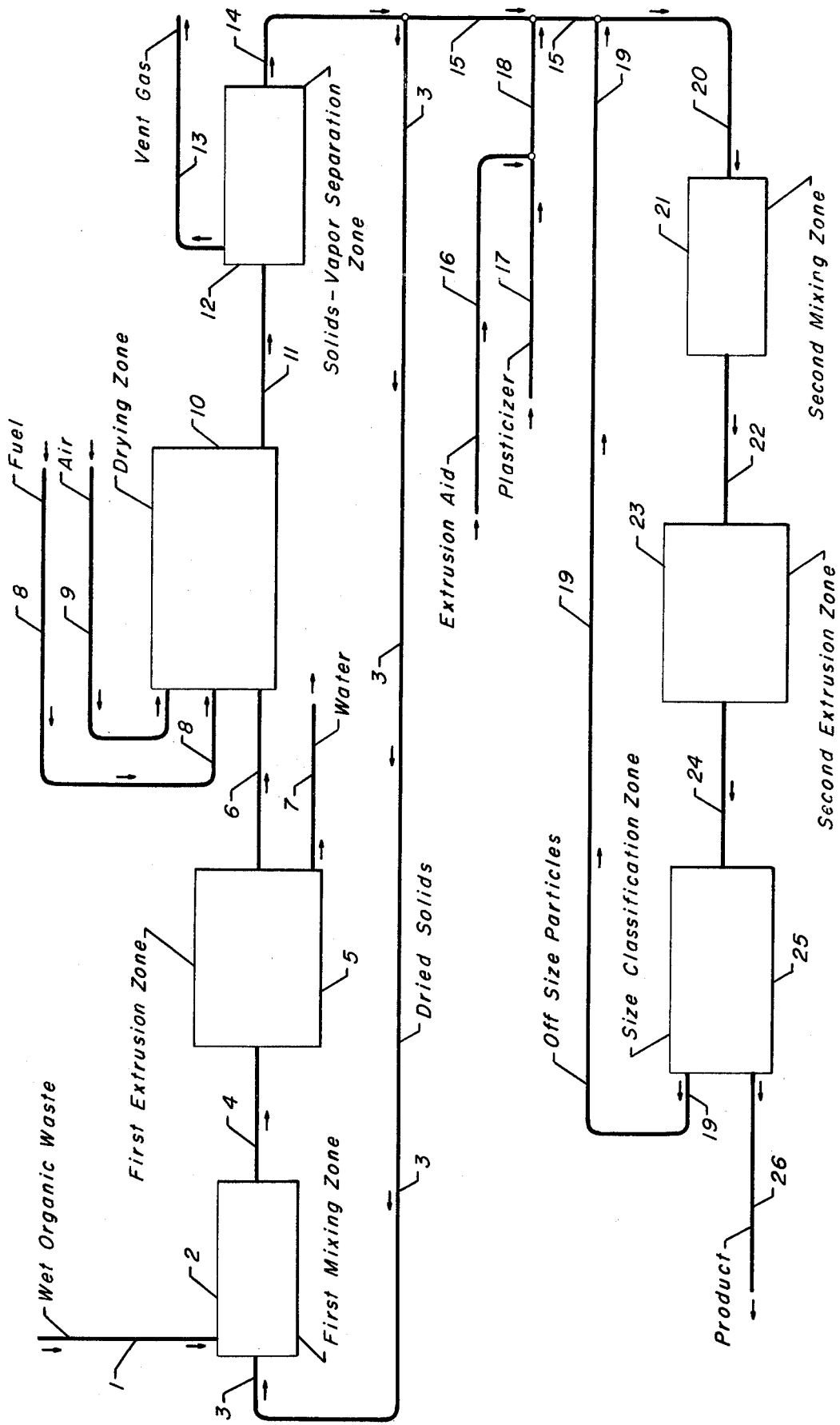

ORGANIC WASTE DEWATERING AND DRYING PROCESS

CROSS-REFERENCE TO RELATED APPLICATION

This application is a continuation-in-part of my prior copending application Ser. No. 775,673 filed Mar. 8, 1977.

FIELD OF THE INVENTION

The invention relates to the removal of water from solid organic waste. The invention also relates to the drying of solid material by contacting the solid material with hot vapors. The invention particularly relates to the sequential dewatering and drying of an organic waste, such as sewage sludge, and to the production of fertilizer or soil builders from the organic waste.

PRIOR ART

The large amounts of organic waste which are produced annually and the need to dispose of this waste have prompted attempts to develop economic organic waste disposal methods. Increasingly stringent environmental standards have also acted as a stimulus to the development of such methods. One well known method is that utilized in metropolitan Milwaukee, Wis., to dry municipal sewage sludge to produce an organic plant food called Milorganite. I t is believed that the sludge is dried by the use of large rotating kilns through which hot vapors are passed. A different system in which a flash dryer is used is in operation in Houston, Tex. It is therefore known in the art to dry organic waste by contact with hot vapors.

The prior art processes have two other features in common with the subject process. First, the vaporous effluent of the drying zone is often passed into a solids-vapor separation zone to collect or remove particles of the solid product. This zone typically comprises one or more cyclone-type separators. Second, it is known in the art to recycle a portion of the dried product and to admix this dry material with the incoming feed material. However, this is performed to form a somewhat drier charge material which is fed to the drying zone. The drier charge material is desired to expedite the feeding of the organic waste into the drying zone and to lessen accumulation of the raw waste material on the walls of the drying zone.

The preferred toroidal drying zone is well described in the literature. It is described for instance in U.S. Pat. Nos. 3,329,418 (Cl. 263-21); 3,339,286 (Cl. 34-10); 3,403,451 (Cl. 34-10); 3,546,784; 3,550,921 (Cl. 263-53); 3,648,936 (Cl. 241-5); 3,667,131; 3,856,215 (Cl. 241-39); 3,922,796 and 3,945,130. The use of such a dryer in a process for the treatment of organic wastes is taught in U.S. Pat. No. 3,802,089 (Cl. 34-8). This reference shows the discharge of the toroidal dryer being directed into a cyclone separator and the recycling of the separator off-gas to the drying zone. The preferred toroidal dryer may be similar in structure to the size reduction apparatus referred to as a fluid energy or jet mill. This apparatus is described at pages 8-43 of the 4th Edition of *The Chemical Engineers' Handbook* published by McGraw-Hill Book Co., 1963. The subject dryer is operated in a manner similar to many of these mills except for the use of heated gas streams as the high-velocity streams charged to the apparatus.

Previously cited U.S. Pat. No. 3,802,089 is pertinent for its disclosure of the use of a dewatering unit to remove water from organic waste prior to its injection into a toroidal drying zone. The teaching of this reference is, however, limited to the use of a centrifuge or a vacuum filter or a combination of the two. U.S. Pat. No. 3,984,329 (Cl. 210-396) presents a conveyor-type device designed for dewatering sewage sludge. These references do not suggest the extrusion of the organic waste, nor do they suggest the admixture of the organic waste with the dried product prior to extrusion as part of a dewatering and drying operation.

Previously cited U.S. Pat. No. 3,802,089 also discloses the admixture of various additives into the dried material prior to the pelletization of the dried material. The additives disclosed include nutrients to enhance the composition of the product fertilizer and clay, diatomaceous earth, and the like which, when added to the soil, improve drainage qualities and improve the soil. Another class of disclosed additives are thickening agents and the like for the fertilizer products themselves.

BRIEF SUMMARY OF THE INVENTION

The invention provides an improved process for drying organic wastes. The improvement includes a unique dewatering step in which a mixture of the organic waste and dried material is extruded. This dewatering step reduces the amount of water which must be evaporated in the downstream drying step and therefore reduces the amount of fuel consumed in the drying step.

The subject invention includes the steps of admixing an organic waste stream containing more than about 60 wt.% water with a dried solids recycle stream to form a mixing zone effluent stream, partially dewatering the mixing zone effluent stream by extruding it, passing the resultant extrudate into a drying zone and effecting the evaporation of water from the extrudate, separating the effluent of the drying zone to produce a vapor stream and a dried solids stream containing less than about 15 wt.% water, dividing the dried solids stream into two portions, recycling a first portion for admixture with the organic waste stream, and subjecting the second portion of the dried solids stream to finishing operations which produce suitable fertilizer or soil conditioner pellets.

DESCRIPTION OF THE DRAWING

To ensure a complete understanding of the inventive concept, a simplified schematic illustration of the preferred embodiment is presented in the Drawing. In this embodiment an organic waste stream comprising sewage sludge from a municipal treatment center and containing about 20% by weight solids is fed into the process in line 1. This material is passed into a first mixing zone 2 and commingled with a fluffy dry recycle material from line 3. The effluent of the first mixing zone is passed into the first extrusion zone 5 through line 4. Partial water removal from the organic waste admixture is effected by this extrusion process. The water thus removed is conducted away from this zone through line 7. The resultant extrudate, which may be in the form of pellets, is passed into the drying zone 10 through line 6 and contacted in a toroidal dryer with a stream of hot vapors. These vapors are generated by the combustion of fuel entering the process via line 8 with air from a source 9. Preferably, the combustion products are used to form at least part of the hot vapors and are passed directly into the dryer. The drying zone effluent stream carried by line 11 therefore contains the dried solid material contained in the sewage sludge of line 1, combustion products, and the water vapor driven off the dried sludge.

The drying zone effluent stream is passed into a solids-vapor separation zone 12 wherein the combustion products and water vapor are concentrated into a vent gas stream removed from the process in line 13. The solid particles of dried sludge are collected as a dry solids stream transported in line 14. Preferably, this separation of the solids and vapors is at least partly effected through the use of one or more cyclone type separators. A first portion of the dry solids stream is recycled through line 3. The remaining second portion of the dry solids stream is admixed with a relatively small additive stream from line 18. This stream contains a plasticizer from line 17 and an extrusion aid from line 16. Also added to the remaining portion of the dry solids stream is a recycle stream of off-size particles from line 19. All of these materials are fed into a second mixing zone 21 through line 20 and therein admixed to a homogeneous composition.

The effluent of the second mixing zone is passed through line 22 into a second extrusion zone 23. In this zone the effluent stream is compacted at conditions of elevated temperature and pressure sufficient to cause the effluent to plasticize. It is then pushed through a die to produce pellets having a much higher bulk density than the unpelleted dry solids. These pellets are removed in line 24 and passed into a size classification zone 25 as a final finishing step. The pellets are classified according to size as by air blowing or screening, and any dust, undersize particles, and oversize particles are removed for recycling in line 19. The oversize particles may be crushed in a size reduction zone not shown. The finished product is removed in line 26.

DETAILED DESCRIPTION

The drying of organic waste is a multi-step process which may be discussed in terms of the separate operations and their interactions. The overall objective of the process is to dispose of the organic waste and to convert it to a useful and preferably marketable product. In the subject process the organic waste is preferably dried and formed into pellets which may be sold as fertilizer or soil conditioner. The inventive concept is mainly concerned with the partial dewatering of the organic waste prior to the actual drying and finishing operations, but the other steps will be described in some detail to provide a basis for understanding the invention. Parenthetically, it may be added that as used herein the terms "drying" and "dewatering" are not used interchangeably and are not intended to refer to the same operation. Drying is intended to indicate an operation wherein the organic waste is heated and an effluent stream containing less than about 15 wt.% water is produced. Preferably, the organic waste is not directly heated during dewatering, and the solids in the effluent stream will normally contain in excess of 35 wt.% water.

As used herein the term "organic waste" is intended to refer to carbon-containing substances that are derived directly from living or formerly living organisms. Specific examples include human sewage, fat, meat scraps, bones, hair, skin, feces and manure from animal sources, beet pulp, fruit pumice, vegetable and fruit peels and culls, eggs, straw and animal bedding, bagasse, fermentation and distillation residues from vegetable sources, cellulose, and protein production plant effluents, kelp and pharmaceutical wastes. In the preferred embodiment the feed stream to the process comprises a sewage sludge produced in a municipal sewage treatment plant. It may be a primary, secondary, or tertiary sludge, which is digested or undigested. Preferably the feed stream to the process contains about 20 wt.% or more solids.

These organic wastes may be dried to form a slow release fertilizer and soil builder. In order to distribute such a fertilizer in the large scale operations of modern commercial agriculture, it is necessary to utilize mechanical spreaders, for which reason the fertilizer particles should be relatively dense and approximately uniform in size and shape. In the prior art the dried organic waste was compressed to solid pieces which were then crushed to form particles of various sizes and shapes. This method also formed sizable amounts of undesired dust. The product particles then had to be sized, e.g., by screening, with the off-size material being recycled. The amount of this off-size material has reached over 50% of the material being compressed, and therefore was a sizable, as well as undesirable, internal recycle stream. My prior application presents an improved finishing and drying operation wherein the dry solids are extruded and the amount of off-size material is reduced. Plasticizers or extrusion aids may be admixed with the dry solids to aid their extrusion.

As the previously cited references indicate, it has been recognized that it would be advantageous to mechanically dewater the organic waste prior to the drying operation. Basically, such dewatering is intended to reduce fuel consumption, but in the preferred embodiment it also provides a material of suitable consistency for charging to the preferred toroidal dryer. However, it has been found that fine particulate organic waste typified by sewage sludge is not easily dewatered mechanically. For this reason a sizable quantity of the dried solids has been recycled and added to the organic waste stream to form a feed material containing about 50 wt.% or less of water. Such an operation may require admixing several pounds of dry material per 1.0 lb. of organic waste. Recycling dried solids decreases the efficiency of the drying process and increases the capital costs of the necessary equipment.

It is therefore an objective of the invention to provide a method for dewatering and drying fine particulate organic waste. It is another objective of the invention to provide a process for mechanically dewatering sewage sludge. It is yet another objective to provide a process for drying organic waste which has a reduced dried solids recycle rate and a reduced rate of fuel consumption.

Basic to the subject process is the use of a drying zone. This may be any mechanical contrivance in which the organic waste is dried. The dryer may be either a direct or indirect dryer and may operate in a batch or continuous mode. The drying may therefore be effected by contacting the organic waste with a hot surface with intermittent or continuous agitation, but it is preferably accomplished by contacting the organic waste with a hot, relatively dry vapor. There are several ways in which this type of drying may be performed. For instance, the organic waste may be passed into the raised end of a rotating cylindrical kiln while hot dry vapors are passed into the lower end. Other drying systems such as a flash-cage dryer may also be used.

In the preferred embodiment, the drying zone comprises a toroidal dryer. As used herein the term "toroidal dryer" is intended to refer to a dryer in which the material to be dried is passed into an enclosed circular housing wherein the wet material is caused to circulate by hot vapors which are charged to the dryer. It is therefore intended to refer to a dryer similar to that described in the previously cited references including U.S. Pat. Nos. 3,802,089; 3,329,418; 3,403,451; 3,667,131 and 3,856,215. The material to be dried is normally passed into a lower point in a vertically oriented dryer housing and caused to move horizontally by the hot vapors. The wet material is then circulated around the vertically aligned circular loop of the dryer, with dry material being selectively removed with the effluent vapors. The drying conditions used in the drying zone include a pressure which may range from subatmospheric to about 7 atmospheres gauge. Preferably, a toroidal dryer is operated at a slight positive pressure. This pressure may be in the range of from about 0.1 to 0.6 atmospheres gauge. This pressure is required for transportation of the solids.

The heat required to effect the drying may be supplied to the drying zone from any suitable source. It may therefore be supplied by electricity or by a nuclear power plant. The preferred heating method is the combustion of a relatively sulfur-free carbonaceous fluid such as a desulfurized fuel oil or natural gas. The temperature of the hot vapors fed to the dryer may vary from about 500° to about 1350° F. A preferred range of this temperature is 750° to 1250° F.

As was previously mentioned, it has been found by experience that the feed stream to a toroidal dryer should contain at least about 50 wt.% solids. Preferably, it contains about 55 to 70 wt.% solids. This degree of dryness is desirable to prevent portions of the feed stream from depositing on the internal surfaces of the dryer. That is, a soupy feed stream has a tendency to plaster against the walls of the dryer with at least a portion remaining there as an undesired coating. Although various atomization techniques have been presented, the predominant prior art method of increasing the solids content of wastes such as municipal sludge has been to recycle a portion of the dryer effluent. A representative recycle ratio for this type of operation is the addition of 7 pounds of dried solids collected from the dryer effluent to 5 pounds of sludge containing about 20 wt.% solids. The amount recycled is adjusted for other solids contents in the organic waste stream fed to the process. In the subject process the desired degree of dryness is achieved through the recycling of a smaller amount of dried solids and the dewatering of the organic waste as hereinafter described.

The effluent stream of the dryer will contain the dried organic wastes. This material preferably has a water content of about 5–12 wt.%, but higher water contents up to about 15 wt.% may be tolerable. When the drying is achieved through the use of hot vapors, these vapors will also exit the drying zone and will normally contain some entrained fine waste particles. The effluent of the drying zone is therefore passed into a solids-vapor separation zone. This zone preferably contains one or more cyclone separators. Most of the dried waste will be collected by these cyclones. The off-gas of the cyclones may be directed into a wet scrubber such as a turbulent contact absorber or bag-type filter. The filtered off-gas is then passed through an odor scrubber in which contact with deodorizing chemicals including hypochlorites, peroxides, or permanganate can be effected if necessary. An incineration-type odor scrubber may also be used. When the preferred toroidal dryer is used, the dried solids will be removed from the dryer suspended in the warm effluent vapors and passed to the separation zone. These effluent vapors will also comprise the evaporated water and combustion products. They may range in temperature from about 190° to 400° F. and are preferably in the range of 200°–300° F. This separatory zone may be of customary design, and those skilled in the art are capable of effecting its design and operation.

The dried organic waste is normally a fluffy material having a bulk density of about 12 to 16 lb/ft$^3$. The dried material produced from sewage sludge tends to adhere to itself and does not readily flow or spread. It is therefore difficult to transport or to spread as fertilizer. For these reasons it has been compacted to form a particulate product having an average bulk density of about 30 to 65 lb/ft$^3$. Preferably, the density of the product is about 30 to 50 lb/ft$^3$. Formation of such a product may be accomplished by the sequential compaction and crushing operations of the prior art. However, the machines required are relatively expensive, require extensive maintenance, and are often unreliable. Further, the product frequently has poor flow characteristics and the prior art method produces a very large amount of off-size material. It is therefore preferred that compaction be accomplished by the extrusion of dried organic waste. Such extrusion may be aided by the addition of about 5 wt.% of a 30% aqueous formaldehyde solution as a plasticizer, or about 5 wt.% of bentonite as an extrusion aid, or a combination of both of these or similar materials.

The extrusion of the dry fluff may be performed in several types of extruders including press-type extruders. The preferred type of extrusion apparatus uses a screw or auger to force the dried organic waste through a face plate having perforations in the range of 1/16- to ¼-inch diameter. The action of the screw within the barrel of the extruder results in the shearing and kneading of the dried waste, and the waste therefore may be fluxed to a plasticized material within the barrel, with the plasticized material solidifying upon discharge from the extruder. This plasticizing is believed to be at least in part responsible for the improved performance of the subject process. The dried waste may be fed to the extruder at elevated temperatures up to about 200° F. to promote fluxing. Uniform pellet formation may be aided by the use of a rotating finger plate.

The effluent of this second extrusion zone is then passed into a particle size classification or fines separation zone. The zone may comprise any apparatus which will remove dust, fine particles, and oversized particles from the extrudate. One such apparatus comprises a screening mechanism having two vibrating screens to sort out those particles which will not pass through a 6 mesh screen and also those that pass through a 20 mesh screen. The remaining product is referred to as "minus 6 plus 20" and is typical of the size range preferred in fertilizer production. The oversize may be crushed in any suitable manner and returned to the screens. The fines are recycled to the feed of the extruder. A second type of apparatus which may be used in one which utilizes fluidization of the fine particles in air as a means of particle classification. The apparatus presented in U.S. Pat. No. 3,825,116, performs fine particle separations in this manner.

In the subject process particulate organic waste feed streams are adjusted to the proper water content for injection into the toroidal drying zone in a two step process. The organic waste is first admixed with dried solids material in a first mixing zone, which may be of customary design. A smaller amount of dried solids is used in the subject process than in the prior art since the resultant admixture is subsequently partially dewatered in the second step of the process. The amount of the dried solids is to be enough to provide a solids content of at least 50 wt.% after the dewatering step.

The first mixing zone may be separate from the first extrusion zone or it may be combined with it. It is preferred that these mixing and extrusion zones be integrated, possibly to the extent of being located within the same piece of machinery. In this instance line 4 of the Drawing would be a conduit within the machine. The first extrusion zone preferably uses a screw or auger to force the organic waste admixture through a die plate having perforations in the range of 1/16 to 1/4-inch diameter. This effects the release of water at the die plate or at other water removal openings provided in the barrel of the extruder. A wiper may be installed on the outer face of the die plate to slice the extrudate into pellets.

The invention is directed to utilization with particulate organic wastes which have such a high water content and small average particle size that direct extrusion of the raw organic wastes is not easily effected. To be more specific, it is limited to utilization with organic waste feed streams containing over 50 wt.% water. As used in this context, the term "particulate organic waste" is intended to refer to organic waste in which the average of the largest dimension of the waste particles is less than 1/8 inch, and preferably is less than 1/16 inch. Sewage sludge is one example of a material having these characteristics. At the nominal 80 wt.% water content, the composition of such sludge resembles river mud.

In accordance with the previous description, the subject process may be described as a method for dewatering and drying organic waste which comprises the steps of admixing a solids recycle stream with an organic waste stream which is to be dewatered and which comprises water and particulate organic waste, with the organic waste stream containing at least 60 wt.% water, in a mixing zone and forming a mixing zone effluent stream; passing the mixing zone effluent stream into a first extrusion zone, and effecting a partial dewatering of the mixing zone effluent stream and the formation of a water stream and an extrusion zone effluent stream comprising organic waste and water by extruding the mixing zone effluent stream; passing the extrusion zone effluent stream into a drying zone operated at drying conditions and effecting the evaporation of water contained in the extrusion zone effluent stream and the production of a drying zone effluent stream comprising organic waste and water vapor; separating the drying zone effluent stream in a solids-vapor separating zone and producting a vapor stream comprising water vapor and a dry solids stream comprising particulate organic waste and containing less than about 15 wt.% water; separating the dry solids stream into two portions and admixing a first portion of the dry solids stream with the organic waste stream as the solids recycle stream; and, extruding a second portion of the dry solids stream in a second extrusion zone under conditions sufficient to cause the plasticization of the dry solids and the formation of a product stream having a bulk density of about 30–65 lb/ft$^3$.

The results of tests on the extrusion of wet sewage sludge demonstrate the dewatering operation and the benefits derived by dry solids recycle in the dewatering and drying of particulate organic waste. In a first test wet sewage sludge containing approximately 20 wt.% solids was fed into an extruder having a 2¾ inch throat and a die plate with ⅛ inch holes. As water was pressed out of the wet sludge, the consistency of the sludge changed to material resembling soft and crumbly rubber. This material could not be extruded by the relatively low pressure generated by the wet sludge behind it in the extruder. In a second test the wet sludge was admixed with the dried fluffy solids which result from drying the sludge. The weight ratio of dry solids to wet sludge was 1.4:1.0. This admixture was readily extruded and released water at the die plate. In another test, the weight ratio of dry solids to wet sludge was adjusted to 1.0:1.0. This admixture also extruded readily and released water at the die plate.

The subject invention provides several advantages. It first of all allows a decrease in the amount of dried solids which must be recycled to charge wet particulate sludge to a toroidal dryer. The amount of material which is charged to the dryer is reduced, thereby decreasing the size of the dryer required for any specific wet sludge feed rate. A decreased rate also increases the thermal efficiency of the process by reducing the amount of solid material which must be heated to effect the required evaporation. By reducing the amount of dried solids and vapors in the effluent, the amount of heat lost due to the inherent inefficiency in the heat exchange of these hot effluent streams is also reduced. Finally, by dewatering the particulate organic waste the amount of evaporative drying and therefore the amount of fuel consumption is reduced.

The extrusion of the dry solids is preferably performed at both an elevated temperature and an elevated pressure to effect plasticization. Conditions found suitable for the extrusion of dried sewage sludge include a pressure above 500 psig. and a temperature over 300° F.

I claim as my invention:

1. A process for dewatering and drying organic waste which comprises the steps of:
   (a) admixing a solids recycle stream with an organic waste stream which is to be dewatered and which comprises water and particulate organic waste, with the organic waste stream containing at least 60 wt.% water, in a mixing zone and forming a mixing zone effluent stream;
   (b) passing the mixing zone effluent stream into a first extrusion zone, and effecting a partial dewatering of the mixing zone effluent stream and the formation of a water stream and an extrusion zone effluent stream comprising organic waste and water by extruding the mixing zone effluent stream;
   (c) passing the extrusion zone effluent stream into a drying zone operated at drying conditions and effecting the evaporation of water contained in the extrusion zone effluent stream and the production of a drying zone effluent stream comprising organic waste and water vapor;
   (d) separating the drying zone effluent stream in a solids-vapor separating zone and producing a vapor stream comprising water vapor and a dry solids stream comprising particulate organic waste and containing less than about 15 wt.% water;

(e) separating the dry solids stream into two portions and admixing a first portion of the dry solids stream with the organic waste stream as the solids recycle stream of step (a); and, (f) extruding a second portion of the dry solids stream in a second extrusion zone under conditions sufficient to cause the plasticization of the dry solids and the formation of a product stream having a bulk density of about 30–65 lb/ft$^3$.

2. The process of claim 1 wherein the organic waste stream contains over 75 wt.% water.

3. The process of claim 2 wherein the dry solids stream contains less than about 12 wt.% water.

4. The process of claim 3 wherein the mixing zone effluent stream contains at least 50 wt.% organic waste.

5. The process of claim 4 wherein the drying zone comprises a toroidal dryer.

6. The process of claim 5 wherein the extrusion zone effluent stream is passed into the drying zone in the form of pellets.

* * * * *